April 1, 1952     H. F. RAYMOND     2,591,291
RELEASING TAP AND DIE HOLDER
Filed Dec. 24, 1949     2 SHEETS—SHEET 1

INVENTOR
HUBERT FRANK RAYMOND
By Frederick C. Bromley
ATTY.

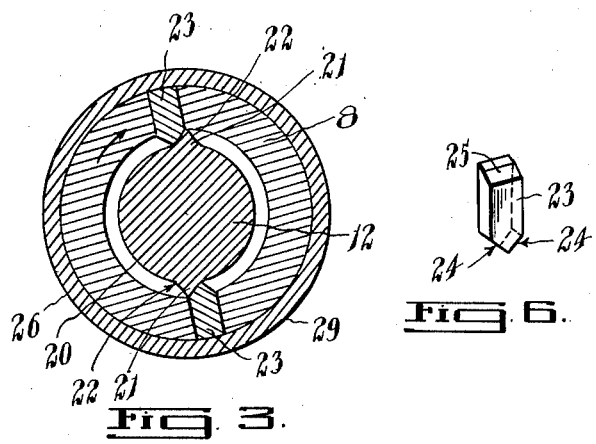
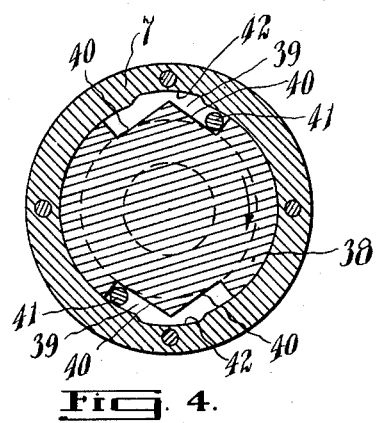
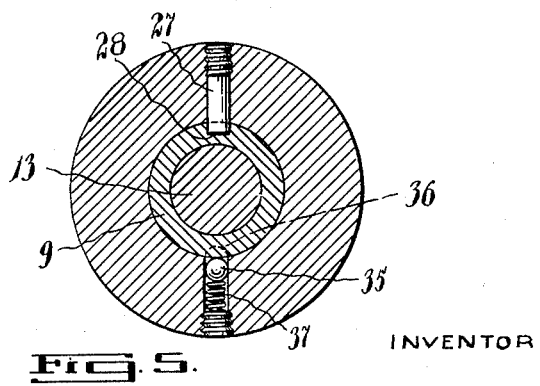

Patented Apr. 1, 1952

2,591,291

UNITED STATES PATENT OFFICE 2,591,291

RELEASING TAP AND DIE HOLDER

Hubert Frank Raymond, Toronto, Ontario, Canada

Application December 24, 1949, Serial No. 134,885

1 Claim. (Cl. 10—129)

My invention relates to tap and die holders of the type adapted for use in automatic screw machines and the like, and in particular to releasing holders of this kind by which the length or depth of the threads cut is accurately controlled. The control of the threading tool holder is usually effected by the provision of a clutch having a positive drive and a device, such as a latch, to disengage the clutch when threading has progressed to the desired point.

In practice it has been found that the clutch is subject to considerable wear and tear with the result that the holder is required to be serviced frequently in order to maintain it in good operating condition. When the holder has to be serviced there is consequent loss in output of the work and production therefore cannot be maintained on the automatic machine.

The object of my invention is primarily to provide an improved clutch mechanism for the holder and one which is not only highly serviceable but which is sturdy and reliable.

A further object of the invention is to provide a releasing tool holder with a releasing mechanism which is inexpensive to manufacture and durable.

Another object is to produce an improved holder of the releasing type which is possessed of a minimum of parts and which is efficient in operation.

A preferred embodiment of the invention is illustrated in the accompanying drawings, in which Fig. 1 is a longitudinal section of the releasing tool holder.

Fig. 3 is a cross section on line 3—3 of Fig. 1 showing how the release mechanism establishes a positive drive.

Fig. 4 is a cross section on line 4—4 of Fig. 1.

Fig. 5 is a cross section on line 5—5 of Fig. 2, and

Fig. 6 is a perspective view of a driving dog which forms a part of the release mechanism.

Figure 1:
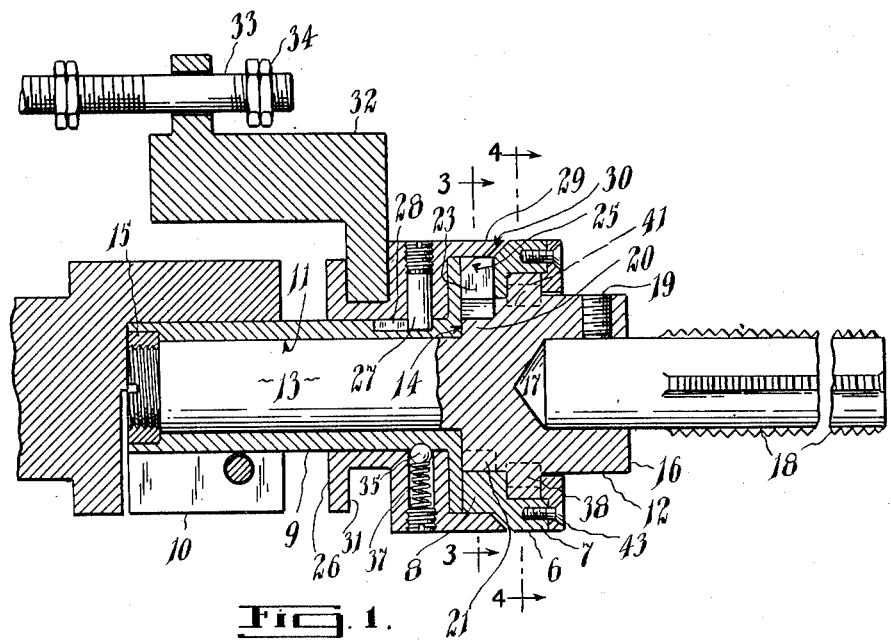

In threading operations performed with taps and dies supported by tool holders of the so-called releasing type, such as those of the type of the present invention, the holder operates to apply a tool to the work while it is being rotated in a machine so that a thread is cut at the desired points. Generally the tool holder is advanced by a chuck or other supporting structure of the machine to start the tool in the work. The tool then feeds itself to complete the threading operation. When the threads have been cut to the desired point the release mechanism releases the tool so that it may turn with the work and thereby discontinue the threading operation. A roll clutch then comes into action to lock the tool so that it cannot turn independently of the chuck. Due to a differential in speeds between the chuck and the work-holding spindle the tool is caused to unscrew and disengage itself from the work. Whereupon the chuck and the tool are returned to retracted positions for threading the next piece of work.

Having recited in a general way how the tool and the holder operate in an automatic screw machine the invention itself will now be recounted in detail.

As shown in the drawings, the releasing tool holder comprises a hollow carrier 6 including a head portion having an annular bore which is of a stepped diameter to provide an outer annular wall 7 and an inner annular wall 8. The shank 9 of the carrier is of a less diameter than said head portion and is held rigidly in the chuck 10 of the automatic screw machine in order that the carrier may be rotated. The shank 9 has an axial bore 11.

Axially mounted in the carrier is a threading tool holder 12 which is journalled in the carrier as by the stud portion 13. The threading tool holder is held against endwise movement as by the thrust shoulders 14 and the collar 15. The head or outer end 16 of the threading tool holder is axially recessed to provide a socket 17 in which the shank of a tool, such as the tap 18, is clamped by the screw 19.

The improved clutch mechanism for establishing a positive drive for the threading tool holder 12 and for releasing it at the end of a thread cutting operation comprises the provision of a rotund section 20 on this holder disposed within the internal annular wall 8 of the carrier and spaced therefrom. The rotund section 20 is circumferentially interrupted by a radial projection in the form of an integral tooth 21 diametrically arranged and having cam faces 22 at opposite sides of the diameter which are desirably curved to meet at a crest. Preferably there are two such teeth, as best shown in Fig. 3, diametrically opposite each other.

The teeth 22 co-operate with driving dogs 23 radially slidable in the head portion of the carrier 6. The inner end of each of said dogs is beveled at opposite sides as at 24, with respect to the axis of rotation of the holder for the purpose of making good contact with an adjacent cam face 22. Said driving dogs may be of a square cross section and engaged in holes of a similar shape to prevent them inadvertently turning—see Fig. 6. The outer ends of said dogs are supplied with a sloping face 25.

On the carrier is a shift collar 26 which is mounted on the shank 9 to slide axially thereof. The axial movement is limited by such conventional means as a pin 27 engaged loosely in a slot 28 extending longitudinally of the shank 9. The outer end of said collar is recessed to provide an annular wall section 29 encircling the head of the carrier and having a sloping end face 30 to mate with the sloping faces 25 of said dogs. A groove 31 is provided around said collar and engaged with the regular yoke 32 which is actuated by a trip rod 33, see Fig. 1. The yoke and the trip rod are elements of the automatic screw machine. The yoke is movable with said collar in a threading operation. The amount of movement of the yoke is limited by an abutment consisting of the nuts 34 on the trip rod, which are set to arrest the travel of the yoke at a predetermined point. When this takes place the collar is stopped against forward movement with the holder to trip the clutch and thus release the threading tool holder.

The collar is shiftable between engaged and disengaged positions. In its engaged position it is forwardly disposed with its annular wall section 29 overlying the dogs and engaged with the outer ends of the dogs to retain them in an inner position in which they engage the teeth 22 to thereby lock the threading tool holder to the carrier so that these members turn as a unit while the releasing tool holder advances in a thread cutting operation. The tripping mechanism of the machine is set to arrest forward movement of the collar at a point approaching the end of the thread cutting operation and as the carrier further advances along with the threading tool holder the collar is withdrawn from its engagement with the dogs which allows the cam faces of the teeth to force the dogs outwardly to sever the driving connection. The tool is then free to turn with the work and the thread cutting is completed, whereupon a conventional roll clutch comes into operation to lock the threading tool holder to the carrier so that the tool can be unscrewed from the work by a difference in angular velocity between the chuck and the work support, as is well known in the art.

Figure 2:
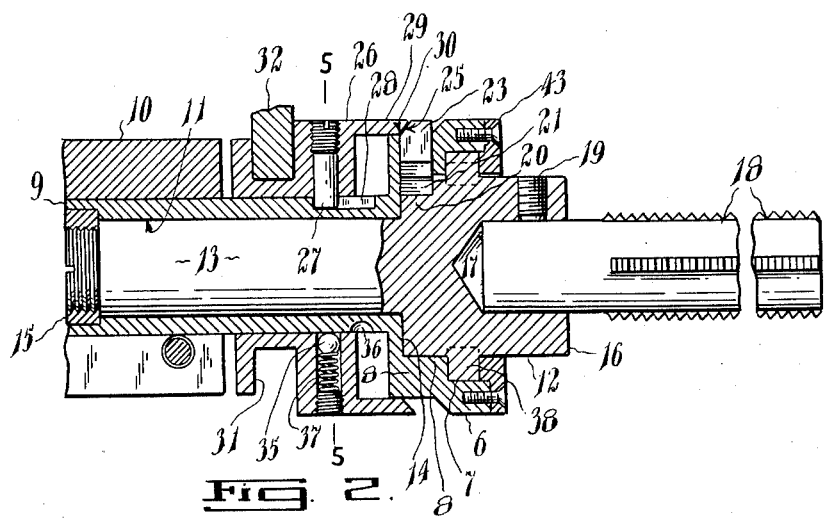
Fig. 2 is a similar view but showing the releasing mechanism for the threading tool holder in its disengaged position.

The collar when in its engaged position, as shown in Fig. 1, is yieldably retained by a ball detent 35 seated in an indent 36. The ball detent is pressed to its seat by a spring 37. Retraction of the chuck forces the collar to its engaged position. In this movement the sloping edge 30 of the collar engages the sloping faces 25 of the dogs to shift them inwardly to locking position, see Fig. 2. The dogs are operable for cutting right or left hand threads.

With particular reference to Fig. 4, it will be seen that the roll clutch is of substantially conventional character. The large diameter section 38 of the threading tool holder is supplied with diametrically opposite cut out portions 39 each formed with a V-shaped inner wall 40. A clutch roll 41 rides between said inner wall and the annular wall 7 of the head of the carrier. The clutch roll is on one side of the V for engagement in an end of a recess 42 in said annular wall. The rolls may be reversed from one to the other side of the respective V's for changing over from cutting right hand threads in order to cut left hand threads and vice versa. The rolls permit the rotation of the threading tool holder within the carrier in one direction but prevent its rotation within the carrier in the reverse direction by a wedging action. The invention is not of course confined in any way to the specific form of the roll clutch described herein. The rolls are retained by means of the ring 43.

The invention provides a satisfactory and reliable releasing mechanism of the clutch type, and its use obviates having to resort to a variation in cam feeds for different speeds of threading on the automatic machine commonly used. Moreover there are no jaws or pins subject to excessive wear by chipping off action. Since the release clutch of the present invention is devised to be disengaged by a trip action it is smooth in operation and very serviceable.

What I claim is:

In a releasing tap and die holder, a carrier having a cylindrical head and shank, said head having an annular bore encompassed by an annular wall portion which is pierced to provide diametrically opposite radial holes each of a square cross section, said holes leading into said annular bore, said shank having an axial bore merging into said annular bore; a threading tool holder having an outer end freely disposed in said annular bore of the head and having a stud portion journalled in the axial bore of said shank and held against endwise movement, said outer end having a rotund section circumferentially interrupted by diametrically opposite radial projections in the form of teeth, opposite sides of said teeth with respect to the axis of the holder being convergently shaped to a crest to form cam faces, a dog slidable radially in each of said holes and being of a square cross section to conform to the cross section thereof, the dogs having beveled inner and outer ends, said inner beveled ends being engageable with said teeth, and a shift collar slidable axially on said shank and having an annular wall section surrounding the head portion of said carrier and provided with a sloping end face for engaging the beveled outer end of the dogs to press the dogs inwardly, said annular wall section of said collar having a bore of a diameter to positively retain said dogs in an inner engaged position when sleeved thereover.

HUBERT FRANK RAYMOND.

REFERENCES CITED

The following references are of record in the file of this patent:

UNITED STATES PATENTS

| Number | Name | Date |
|---|---|---|
| 857,114 | Schnaitmann | June 18, 1907 |
| 1,933,589 | Holmes | Nov. 7, 1933 |
| 2,340,477 | Kruse | Feb. 1, 1944 |
| 2,498,399 | Dodge | Feb. 21, 1950 |